May 3, 1938.  T. H. GAVIN  2,115,712
SAW FILING MACHINE
Filed March 4, 1935   5 Sheets-Sheet 1
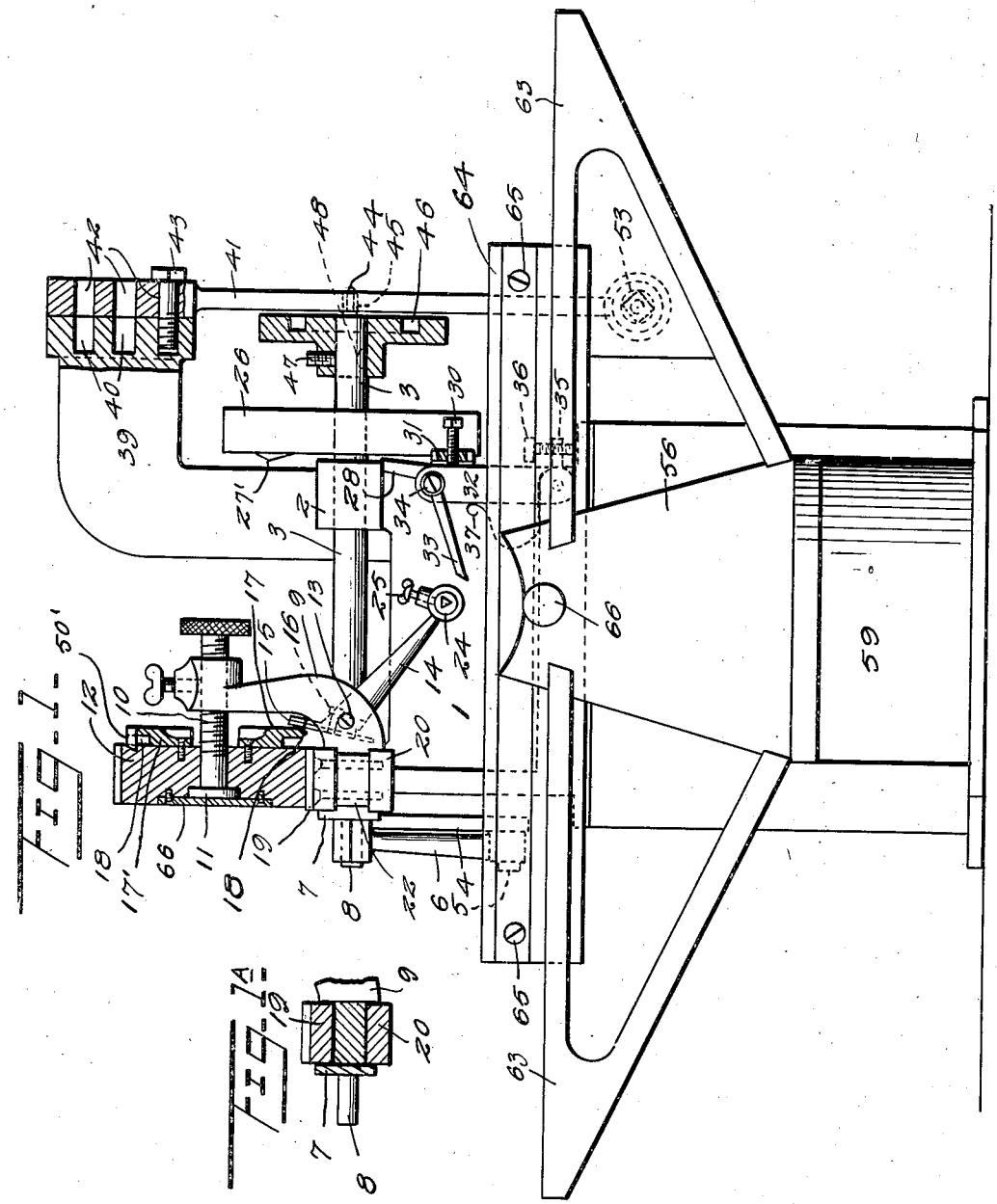
Inventor
Thomas H. Gavin
By Watson E. Coleman
Attorney

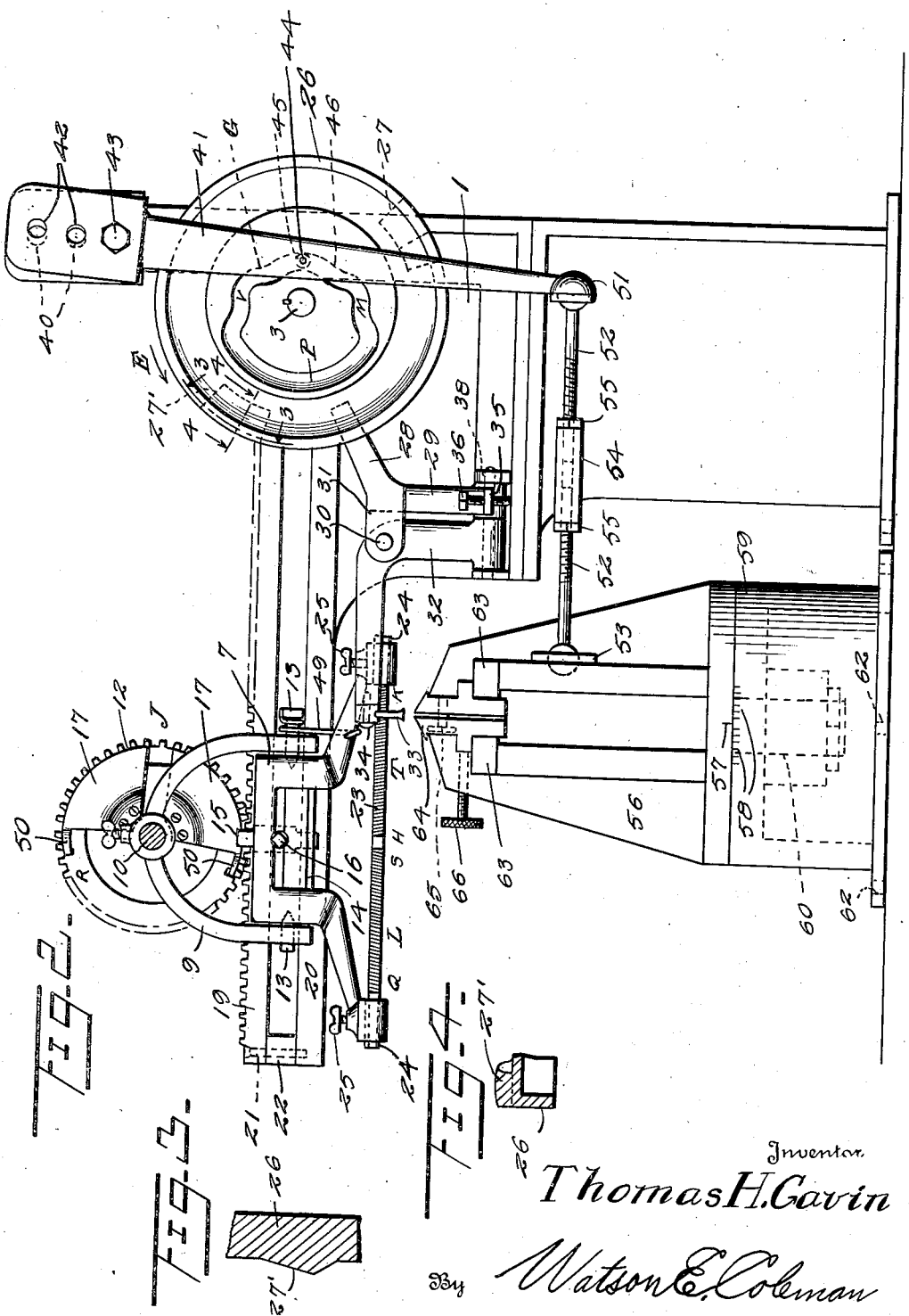

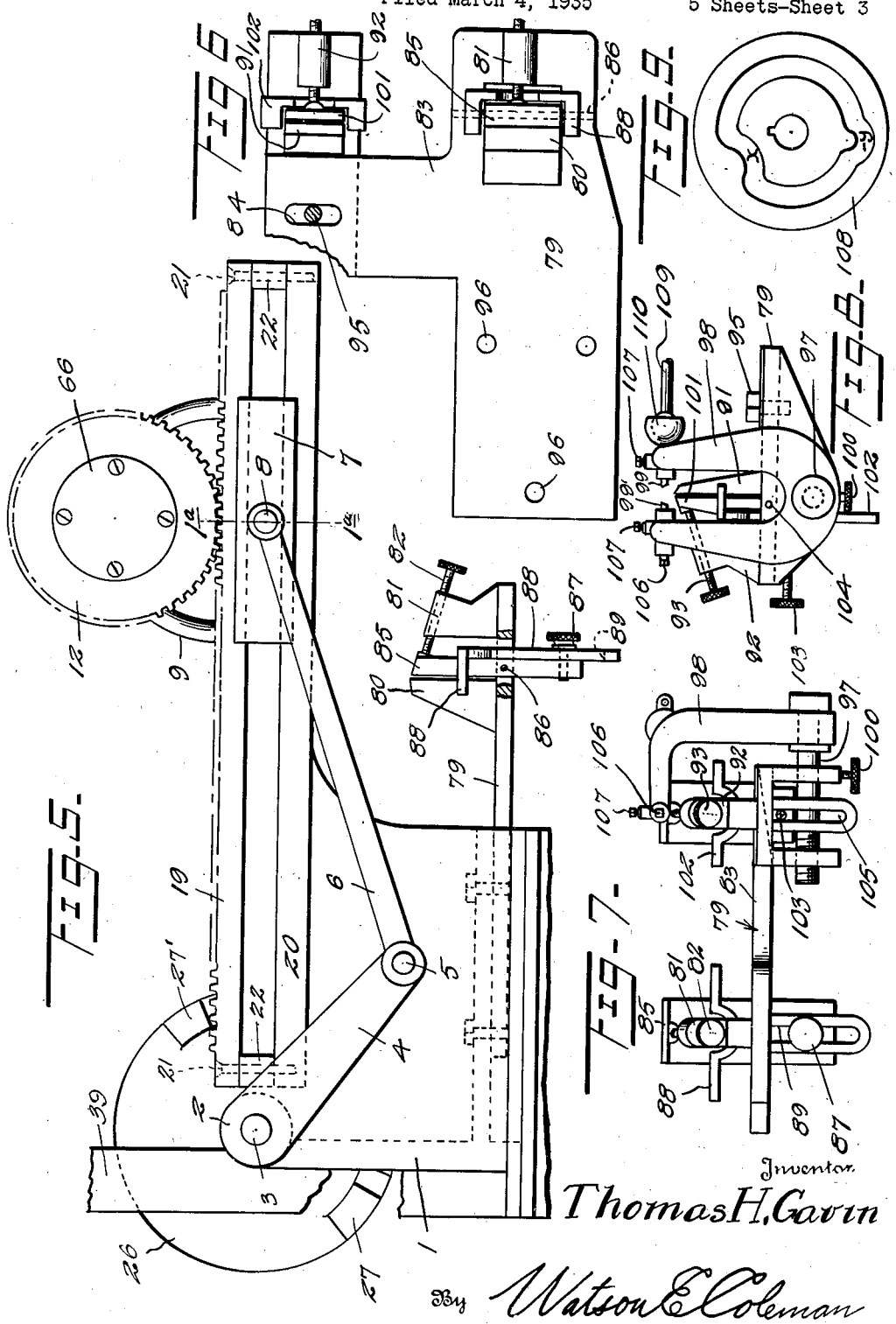

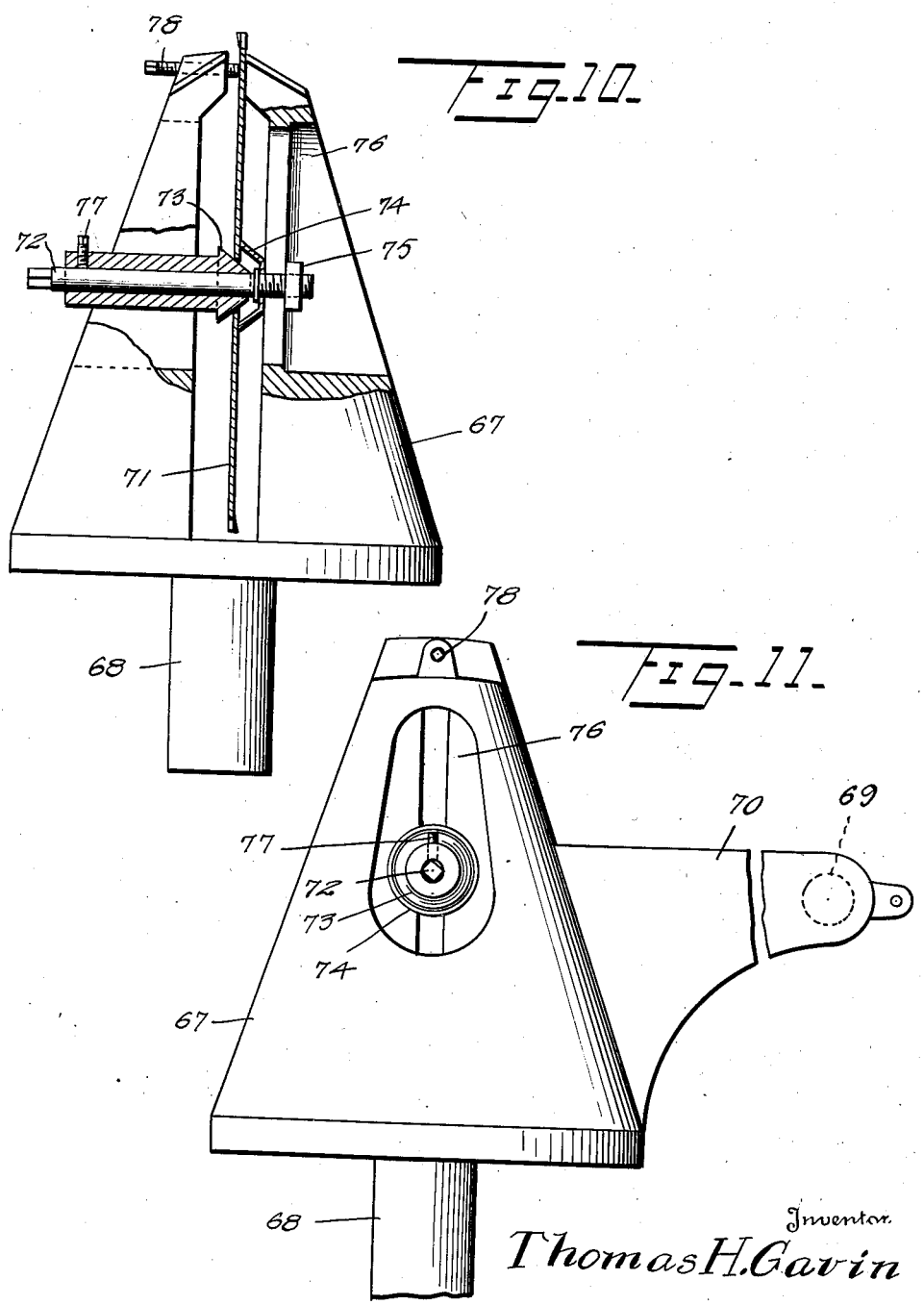

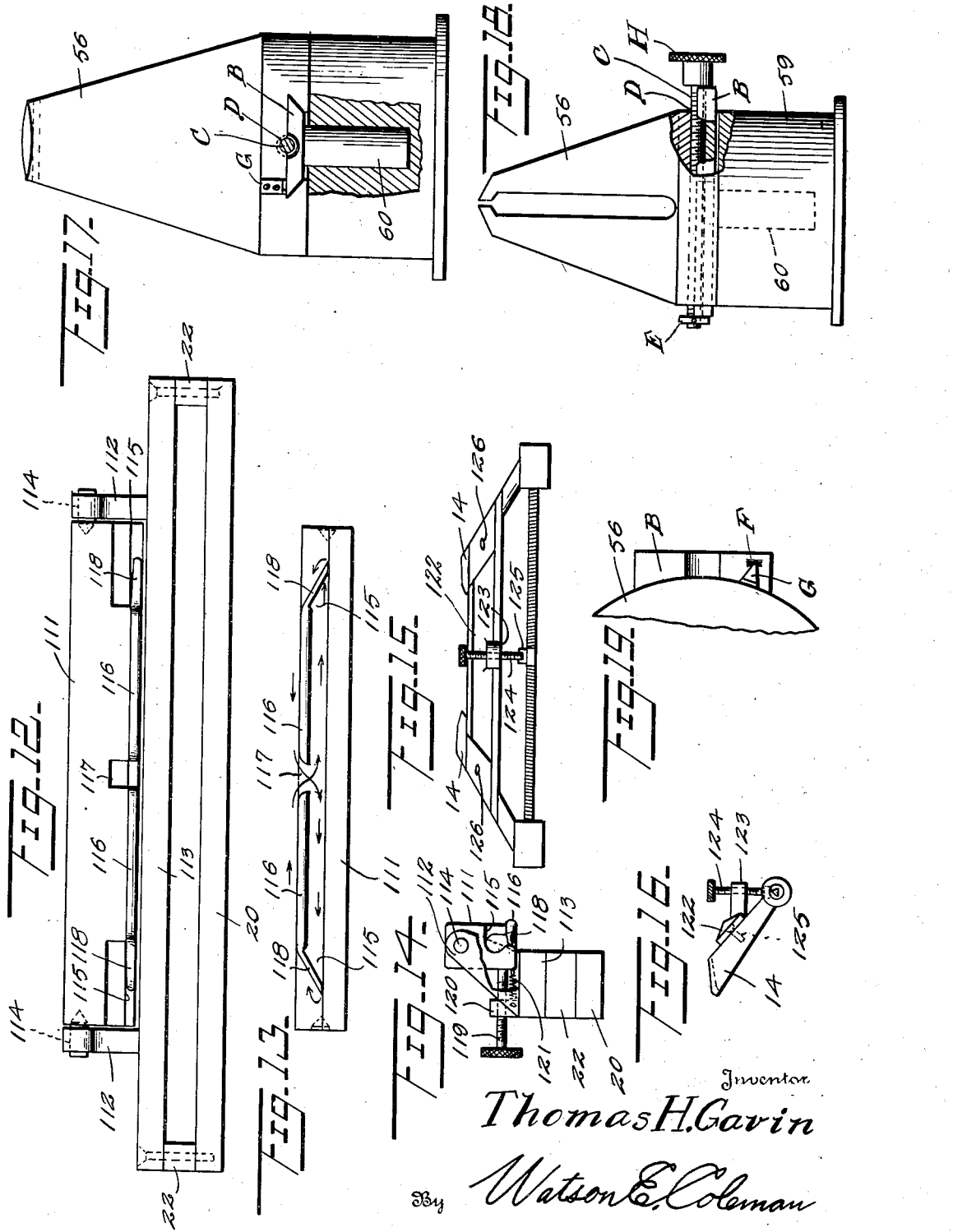

Patented May 3, 1938

2,115,712

UNITED STATES PATENT OFFICE 2,115,712

SAW FILING MACHINE

Thomas H. Gavin, New Orleans, La.

Application March 4, 1935, Serial No. 9,317

18 Claims. (Cl. 76—35)

My present invention pertains to automatic saw sharpening machines and it contemplates the provision of a device that notwithstanding its simplicity of design, the sharpening of handsaws, bandsaws and circular saws will be accomplished in a scientific manner.

The present invention has for its primary object to provide a device which will automatically sharpen handsaws and circular saws having either rip teeth which are filed straight across the blade, or having cross-cut teeth which are filed at an angle across the blade; and will set and sharpen narrow bandsaws in one operation.

Another object of the invention is to provide a saw filing machine employing a novel camming mechanism which controls the downward thrust of a file for a portion of its length and effects the raising of the file clear of the saw teeth through the remainder of its length and repeats this operation upon the return stroke.

A further object is to provide in a saw filing machine, mechanism which in moving a file across a saw for the sharpening of a tooth, will effect a slight downward feeding of the file from the time the file enters between the teeth until it is raised clear thereof whereby the entire length of the file is caused to wear evenly and longer and the stripping of the file teeth is eliminated.

A still further object is to provide a mechanism wherein the different types or shapes of saws are arranged so that they are supported near the gullets of the teeth so as to avoid vibration as the sharpening file moves across the teeth.

Employed in the machine are double-ender files, as one of the features is that all the saw teeth are filed in the direction of their set, eliminating cracked saws, as cracks generally occur only in the gullets of the teeth which are filed against their set, and furthermore, producing teeth equally sharp on both sides of the blade, which is essential for straight and true sawing.

Further features of the invention will be fully understood from the following description and claims when read in connection with the accompanying drawings forming part of this specification, in which:

Figure 1 is a front view of my filing machine when set for filing cross-cut handsaws and illustrating the vise in central position; and cam-gear and bevelling cam sectioned.

Figure 1a is a section taken on the line 1a—1a of Figure 5 through only the cross head and the members between which the cross head moves.

Figure 2 is an end view of the machine with the handsaw vise in central position.

Figure 3 is a section taken on line 3—3 of Figure 2.

Figure 4 is a section taken on the line 4—4 of Figure 2.

Figure 5 illustrates the crank end of the machine, (not complete) and shows how the narrow bandsaw attachment would be secured to the machine.

Figure 6 shows a plan view of the bandsaw attachment (not complete).

Figure 7 is a front elevation of the bandsaw setting and filing attachment.

Figure 8 is an end view of the setting end of the attachment.

Figure 9 illustrates the setting cam which actuates the setting arm on the attachment.

Figure 10 is an end view of the circular saw vise, showing the saw sectioned. The wing is not shown.

Figure 11 is a front elevation of the circular saw vise.

Figure 12 is a front view of a modified form of cam for controlling the motion of the file, such as is shown in Figures 1 and 2.

Figure 13 is an inverted plan view of the cam bar, illustrating by arrows the manner in which the follower moves to impart downward and upward motion to the file.

Figure 14 is an end view of the cam bar when looking toward the machine a portion being broken away, and illustrates the means for adjusting the cam to regulate the downward thrust of the file.

Figure 15 is a front elevation of the stiffener bar and illustrates how it would be adapted to prevent bending or springing the file.

Figure 16 is an end view of the stiffener bar.

Figures 17, 18 and 19 illustrate means for centrally locating saws of various gauges or thicknesses.

Similar numerals of reference designate corresponding parts in all the views of the drawings.

The frame 1 has the bearings 2, one on each end of the back of the frame and mounted in the bearings is a shaft 3 having a crank 4 and pin 5 adapted to engage connecting rod 6 that is secured to the cross-head 7 by pin 8. The head 7 is arched at 9 to receive a threaded shaft 10 having a head 11 that fits into a recess in the cam-gear 12. The shaft 10 regulates the downward thrust of the file and by screwing the shaft one way or the other the file is either raised or lowered. My novel file holder 14 is held in the cross-head 7 by the screws 13 and said holder 14 is provided with a follower 15, secured thereto by capscrew 16. The follower 15 is caused to move outwardly or forwardly by cam-bearing 17, which movement causes file-holder and file to move downward. Secured to the ends of cam bearings 17 are spring clips 50 and 50' that press against the inner bearing 18 and form means for elevating the follower from the inner to the outer bearings, while spring 49 keeps an upward tension on the file-holder, thus keeping the follower in contact with the cam-bearings. The cam-gear 12 moves on rack 19 that is fastened to wing 20 of the frame 1 by means of bolts 21, having spacing blocks 22 interposed between.

The double-ender file 23 is held in sockets 24 and the sockets are secured in the file-holder 14 by thumb screws 25. Mounted on one end of the shaft 3 opposite the crank end thereof is a cam wheel 26 having two raised portions 27 and 27' hereinafter called hickies, which provide means for feeding two saw teeth per one revolution of the crank and cam, by said hickies coming in contact with wing 28 of the tooth-spacing arm 29 which is provided with the thumbscrew 30 through the offset 31 of said arm for adjusting feed-finger arm 32 to which is attached the feed-finger 33 by bolt 34 so that the finger is free to move from one tooth to another in order to feed the saw along. Through another projection or offset 35 of tooth-spacing arm 29 is a thumbscrew 36, providing means for adjusting the length of the feed-finger stroke to correspond to the spacing of the teeth of the saw being filed. The spring 37 recedes arms 29 and 32 which are adapted to the machine by pin or shaft 38, as well as finger 33 which is attached to arm 32. Manifestly, thumbscrew 30 is to place the saw teeth relative to the file, and thumbscrew 36 is to lengthen or shorten the feed-finger stroke.

Secured on the back of frame 1 is a bracket 39 having apertures 40 and this bracket 39 holds the swinging-arm 41 which has apertures 42 and through which is secured the bolt 43. In the center of the arm 41 is secured a pin 44 on which is a roller 45 which travels in the cam groove or roll path 46 and this cam is held to the shaft 3 by the screw 47, and key 48 prevents the cam from slipping as well as making it impossible to replace the cam in any other than the proper position.

A ball-socket joint 51 is provided at the end of the arm 41 to accommodate the link 52 and at the opposite end of the link 52 a ball-socket joint 53 is secured, in between which is a turnbuckle 54 and jam nuts 55, providing means for connecting arm 41 to either vise 67 (Figure 11) or vise 56 and regulating said vises so that line 57 on the vise will swing equal distances each way by the lines 58 on the vise base 59. The vise 56 has ways 63 on which slide clamps 64, between which the bandsaw is clamped by the screws 65. A slight pressure against the clamps is maintained by the screw 66. While I have shown the ways 63 of the vise 56 straight, as well as the clamps, it will be understood that said vise ways and clamps could be arc-shaped in order to file saws with a breasted cutting or tooth edge.

The circular saw vise 67 has a shaft 68 to fit in the base 59 and a ball-socket 69 to accommodate the ball of link 52. In order to bring the ball-socket in line with the link 52 and arm 41 as well as to make it easier for the arm 41 to swing the vise, I provide the wing 70. The saw 71 is held in the vise 67 by a mandrel 72 around which is a cone 73 to centrally locate and hold saws of various bore sizes, and further provided on the mandrel is a cup 74, while said mandrel has nut 75 which fits in the slot 76 in the back of the vise 67 in order to properly position saws of various diameters and that mandrel 72 may be removed so that the saw can be taken from the vise. A setscrew 77 is provided to fasten the cone after the saw is properly positioned in the vise, and a screw 78 provides the necessary pressure to avoid chatter and vibration, but allowing the saw to be fed through the vise without strain on the tooth-feeding members.

The narrow bandsaw setting and filing attachment 79 consists of a stationary jaw 80 (Figure 5), a standard 81 for the screw 82 and a wing portion 83 that has an oblong hole 84, and the bottom side of said wing is bevelled as shown in Figure 7. Movable jaw 85 is hinged by pin 86, and screw 87 secures the saw rest 88 which supports the blade on both sides of the vise jaws 80 and 85, said rest has long slot 89 so it can be vertically adjusted to accommodate saws of various widths. Frame 1 has holes to correspond to holes 96 of the attachment 76 for fastening to the machine.

The setting mechanism has a stationary jaw 91 and a standard 92 for the pressure screw 93; the top of the back part of the setting mechanism is bevelled to correspond with the bevelled part of wing 83 and has a threaded hole 94 to receive the cap screw 95. The bevelled surfaces provides means for vertically adjusting the setting mechanism so only the points of the teeth will be set or bent, instead of bending the whole tooth; whether setting course or small teeth.

I provide a mandrel 97 on which rocks the U-shaped setting arm 98 so the mandrel can be screwed inwardly or outwardly, thereby providing a horizontal adjustment of the hammers 99 and 99' secured in the angled offset ends of the two portions of the arm 98 so they will set the teeth in their proper direction. Screw 100 fastens the mandrel 97 after adjustments are made.

There is a movable jaw 101, to which is attached the saw rest 102 by screw 103; said jaw is hinged by the pin 104 and the saw rest 102 has a long slot 105 for vertically adjusting the rest for various widths of bandsaws. The set screws 106 are adapted to adjust the hammers 99, and the set screws 107 fasten the hammers after they are adjusted. To the bracket 39 is adapted a swinging-arm (not shown) similar to the arm 41, or, another ball-socket could be made in the arm 41, being placed about midway between the roller 45 and the ball-socket 51, whereby, the roller 45 would engage the groove in the setting-cam 108 which is secured to the shaft 3 in place of the bevelling-cam shown in Figures 1 and 2, and link 109 would connect the swinging-arm with the U-shaped setting arm 98 at ball-socket joint 110.

In Figures 12, 13 and 14, I show views of my modified form of file-controlling cam 111 which is supported between brackets 112 by the screws 114. This cam bar 111 has an inner bearing 115 which is similar in length to the said cam bar; also provided is an outer bearing 116 which is similar in length to the file 23 held in the file-holder 14, and this bearing 116 is divided into two sections because of the opening 117. At the ends of the bearings 116 are fixed the spring clips 118 which press on bearing 115. The spring clips permit the follower 15 of the file-holder 14 to pass under and then provides means for elevating the follower from the inner bearing to the outer bearing 116, which causes the downward movement of the file. Screw 119 supported by the standard 120 which is a member of guide bar 113 as well as brackets 112, provides means for regulating the downward thrust of the file with accuracy and precision. A spring 121 keeps the cam bar pressed against the regulating screw 119. The outer bearings of either the cam gear 12, or the cam bar 111 which is my preferred embodiment, can be slightly sloping from the opening down to the spring clip end of the bearing on each end, thus, causing the file to cut most gradually, also lengthening the life of the file and preventing stripping the file teeth, as well as having a desirous effect on the saw being filed by eliminating burrs on the side of the teeth.

Also provided, is the stiffener bar 122 which is secured to the file-holder 14 by screws through the apertures 126. This stiffener bar 122 has an offset or projection 123 through which is the screw 124 on the end of which is a cap 125 which is serrated to engage the corner of the file and prevent it from springing or bending when it comes into contact with the saw teeth. The bar is constructed and arranged so as not to obstruct the view of the file.

By referring to Figures 17, 18 and 19, I show means for centrally locating saws of various thicknesses. It is to be understood that the exact center of the thickness of the saws held in the vises 56 and 67 must be directly over the center of the shafts 60 and 68, and this means for centrally locating the saws is accomplished by providing the shafts 60 and 68 with a dovetail portion which extends through a corresponding dovetail in the vises 56 and 67. The screw C fits in the opening D which is threaded only on the vise half of the opening or hole D, while the portion B is not threaded. This screw C has a set collar E and the dovetail part of the shaft is provided with the lines F while a pointer G is fastened to the vise. By turning the wheel H secured to the screw C, the vise can be moved inward or outward so saws of various gauges can be located directly over the center of the shaft by placing the pointer G to the line designated for that particular gauge saw. It is very necessary that the saws be located centrally in the vise, especially when sharpening cross-cut handsaws or circular saws, otherwise, the teeth of the saw being filed will be unevenly spaced and will be higher on one side of the blade than on the other.

The foregoing describes the operation of this machine when sharpening cross-cut and rip handsaws, and circular saws, and when setting and sharpening narrow bandsaws.

Figures 1 and 2 show the machine set for filing cross-cut handsaws. The saw being placed between the clamps 64 is held firmly thereto by tightening the screws 65. The handle end of the saw being placed at the left of the clamps. After adjusting the screw 36 to give the feed finger 33 the proper stroke, and also the screw 30 to place the teeth in proper relation to the file, that is, placed so the file will contact the face of one tooth and the back of the adjoining tooth evenly, the machine is ready to be started filing the saw from the first tooth at the butt or handle end of the saw to the last tooth at the tip or point end of the saw. The saw teeth being in proper relation to the machine movements, which means that the backs of the teeth will be filed in the direction of their set.

The crank shaft 3 to which is secured the camwheel 26 which can be used as the driven pulley, the bevelling cam 46 as well as the crank 4 which is connected to the cross-head 7 by the rod 6, would be revolving in the direction of arrow E.

The crank is on the forward stroke center, which places the cross-head at the front end of the guide bars 19 and 20 and the cam gear 12 is rolled around so follower 15 is at place F on the cam and at which time the file is raised. At the same time, roller 45 of the swinging arm 41 is in the part marked G of the groove of cam 46, thereby, swinging forward the right-hand end of vise 56 through which is slidably mounted the saw holding clamps 64, so that the teeth will be filed on an angle to produce bevelled teeth.

As the crank shaft is revolved, the cross-head is pulled toward the machine, causing the cam gear to roll along rack 19 and causing the follower 15 to ride up spring clip 50 and onto outer bearing 17 which causes the K end of the file to contact the teeth and file same until it reaches the place marked H, at which time the follower gets to the opening J and goes onto the inner bearing 18, causing the file 23 to raise clear of the teeth as the other half of the file passes over. When the place marked L gets over the saw as the balance of the file passes over in its raised position, two motions are simultaneously performed, roller 45 goes into part of groove marked M, causing the vise and saw to be swung parallel with the feed-finger 33 as shown in Figure 2, and cam hickey 27' of the cam wheel 26 contacts wing 28 of arm 29, causing the feed-finger to place the next tooth in position for filing.

When the crank has reached the back center, the follower has already passed under spring clip 50' and to the place marked R on cam 12, and the roller 45 of arm 41 is in part of groove marked P on cam 46, which causes the right-hand end of the vise 56 to be swung backward so the tooth that was fed to position will be filed on bevel. As the crank turns over, and the cross-head and cam move along, follower 15 ascends the spring clip 50' which causes the Q end of the file to contact the teeth and files same as it is pushed across until it reaches the place marked S, at which time, the follower 15 has reached the opening J and passes from the outer bearing 17 to the inner bearing 18 which causes the file to raise so the other half can pass over. And when the place marked T gets over the saw as the file is passing over in its raised position, again the saw is placed parallel with the feed-finger and is fed up another tooth, because the roller 45 on arm 41 has reached the part of groove marked V, and the cam hickey 27 has come in contact with the wing 28 of the arm 29. And when the crank reaches the forward center which places the cross-head at the outer end of the guide bars, again the vise is swung so the teeth will be bevelled filed, because the roller has entered the part of groove marked G. This operation is continued until the full length of the saw is filed. Two teeth being filed to each revolution of the crank.

When filing rip saws, setscrew 47 is loosened and the cam 46 is pushed toward cam 26, to disengage the roller 45 on the arm 41 from the cam groove; after which another bolt like 43 is placed in one of the other holes 40—42 in order to hold the vise firmly at right-angles with the file so the teeth will be filed square across, instead of on a bevel.

When filing circular saws having cross-cut or rip teeth, the operation and adjustments are the same as when filing handsaws, only, of course, the circular saw vise 67 is mounted on the base 59 in place of vise 56.

The holes 40 and 42 are also provided so the vise can be swung to various degrees of angle.

When the machine is to be used to file and set narrow bandsaws, the vise is removed from the base 59 and the cam 46 from the shaft 3; and then the filing and setting attachment as shown in Figures 5, 6, 7 and 8 is fastened to the machine and the setting cam 108 as shown in Figure 9 is mounted and secured to the shaft 3 so the roller of the swinging arm engages the groove, and the link 109 is connected to the swinging arm.

The bandsaw blade is placed between the vise jaws 80—85 and 91—101, and the saw rest 88 on which the back of the blade slides is adjusted up or down so the gullets of the saw teeth will extend above the vise about one-sixteeth inch, after which, the screw 82 which applies the necessary pressure nearest the gullets to eliminate chatter and vibration when the saw is being filed, is tightened sufficiently so the saw can be fed through the vise without undue strain on the tooth feeding mechanism.

After that adjustment is made, the setting part is adjusted. If the saw being filed has large teeth, the setter which is vertically adjustable, is raised enough so just the top half or less of the tooth extends above the vise, so the teeth will be properly set instead of bending the entire tooth. The saw rest 102 is adjusted then, to support the saw as it passes through the vise. Screw 93 applies the necessary pressure, like screw 82. When the machine is started filing the backs of the teeth in the direction of their set, and the faces of the teeth against the set simultaneously, it may be found that the setting hammers 99 are not in proper relation to the set of the teeth, so the shaft 97, on which the U-shaped setting arm 98 rocks and which arm has the hammers 99 secured in the horizontally-bent portions thereof, is screwed one way or the other, in order to act in the direction relative to the set.

When the file is being pushed across the tooth and gets to the place marked L, the roller of the swinging arm which is in the groove of cam 108 gets to the part marked X which causes a quick thrust of the hammer 99' toward the machine, setting the tooth in that direction. The file is raised clear of the saw when it reaches the part of the file marked S; and when the place marked T is over the saw as it is passing in its raised position, another tooth is fed to position for setting and filing.

Then, as the file is being pulled across the tooth that was fed to position, and gets to the place marked T, the swinging arm roller gets in the Y part of the groove of cam 108 which causes a quick thrust of the hammer 99 away from the machine, setting the tooth in that direction. When the file gets to place marked H, the file raises, and when the part of file marked L gets over the saw as it passes in its raised position, another tooth is fed to position for setting and filing. That operation is continued until the full length of the saw has been set and filed. And when it is unnecessary to set the saw, the cam can be disengaged from the swinging arm roller and the swinging arm locked in central position, the same way as was explained about the bevelling cam 46.

While I have shown and described my machine in its preferred design, variations may be made thereto without departing from the purpose and claims thereof.

What I claim is:

1. In a double-acting saw filing machine, having in combination, a frame, a shaft rotatably mounted thereon and having means for reciprocating a cross-head mounted in guide bars over the saw supporting means, a file-holder pivoted on the cross-head and having sockets secured therein for holding the file perfectly parallel with the guide bars, and the said sockets are adjustable so the file can be set relative the hook of the saw teeth, and forming an integral part of said file-holder is a follower which engages and co-acts with a cam having two bearing surfaces, one above the other, and which are parallel with the guide bars and file, and which have means for elevating the follower from the inner to the outer bearings and other means for allowing the follower to go from the outer to the inner bearing, whereby, rotation of the shaft imparts a horizontal reciprocating motion to the cross-head and simultaneously, horizontal and vertical movements to the file-holder and file, as shown by the arrows in Figure 13, other means are provided for moving the cam for regulating the downward thrust movement of the file relative the saw teeth.

2. In a double-acting saw filing machine having in combination, a frame, a shaft rotatably mounted on the frame, a cross-head slidably mounted in guide bars of the frame and over the saw supporting means, a file-holder pivoted on said cross-head and co-acting with a cam independent of the shaft, a cam wheel having two hickies which intermittently engage an arm having means for increasing or decreasing the movement caused by said engagement and other means for adjusting an adjacent arm independently of the first-mentioned arm, to intermittently feed the saw teeth to position for setting and filing, and two teeth being so positioned to each revolution of the shaft and cam wheel; and secured to the frame below the file-holder and file is means for supporting a bandsaw having two independent vises for supporting the saw and through which it passes, and two independent saw rests on which the saw slides, means for applying the necessary pressure adjacent the vise tops to avoid chatter and vibration as the file moves across the teeth in either direction, a U-shaped setting arm having offset portions for supporting the hammers relative the vise, said arm is pivoted on a shaft and is laterally adjustable in order that the hammers can be placed relative the set of the teeth, means are provided for simultaneously adjusting the setting vise, arm and hammers, so only the tops of the teeth will be set instead of bending the entire tooth, means for adjusting the saw rests for supporting saws of various widths, means being provided so the teeth will be set evenly on both sides of the saw, a cam secured to the shaft on the frame, a link connecting the setting arm with the swinging arm which is pivoted on a bracket of the frame and having a roller which engages the groove of the cam, which actuates the setting hammers from side to side and with respect to the teeth and file.

3. In a double-acting saw filing machine, having in combination, a frame, a crank shaft rotatably mounted on the frame and providing means for reciprocating a cross-head supporting a file-holder and in which is secured a double-ender file horizontally over the saw supporting means, means for intermittently feeding the saw teeth in position for filing, a vise pivotally mounted on a base independent of the frame and under the path of the file, saw clamping members slidably mounted on the vise, means for applying the necessary pressure to the clamps to avoid chatter and vibration as the saw is filed in either direction, means for horizontally adjusting the vise irrespective of the pivot in order that the center of the saw may be placed directly in line with the center of said pivot, a gauge being provided to make such adjustments most accurate, a link connecting the vise with a swinging arm pivoted on a bracket of the frame, a cam secured to the shaft, a groove in said cam being engaged by a roller on said swinging arm and imparting an intermittent oscillation to the vise and saw and in harmony with the file and tooth feeding means, means for adjusting the vise to oscillate evenly each side of central position, means for increasing or decreasing the amount the vise oscillates, and other means for disengaging the oscillating means and holding the vise in central position.

4. In a saw filing machine, a saw support adapted to permit movement of a saw carried thereby, a frame including a cross-head guide extending transversely of the support, a cross head slidably carried in said guide, a fixed rack on the guide, means for reciprocating said head, an arm carried by the head, a toothed cam wheel pivotally carried by said arm and in mesh with said rack, a frame oscillatably carried by said arm and adapted to hold a file in working relation with the saw support, and means connecting said frame with the cam of said cam wheel whereby vertical oscillation of the file frame is effected during its reciprocatory movement with the cross-head.

5. In a saw filing machine, a saw support adapted to permit movement of a saw carried thereby, a frame including a cross-head guide extending transversely of the support, a cross-head slidably carried in said guide, a fixed rack on the guide, means for reciprocating said head, an arm carried by the head, a toothed cam wheel pivotally carried by said arm and in mesh with said rack, a frame oscillatably carried by said arm and adapted to hold a file in working relation with the saw support, means connecting said frame with the cam of said cam wheel whereby vertical oscillation of the file frame is effected during its reciprocatory movement with the cross-head, and means for shifting said cam wheel transversely of the rack to vary the effective action of the cam upon the frame means in contact therewith.

6. In a saw filing machine including means for supporting and effecting the movement of a file in a horizontal reciprocatory path and a vertical oscillatory path, a saw carrier comprising a base, a head mounted thereon for oscillation about a vertical axis, a pair of arms carried by and extending oppositely from said head and each comprising two parallel members, a pair of saw clamping jaws slidably supported by and between the members of said arms and shiftable from one arm to the other, means for intermittently moving said jaws along said arms while the arms are disposed at right angles to a file in said file supporting means, and means for intermittently swinging said head to move said jaws from one position oblique to the file to the opposite oblique position relative thereto and for maintaining the head and jaws stationary intermediate such positions and when the jaws have been oscillated to the extreme point of each position.

7. In a saw filing machine, means for supporting a saw for filing, a guide, a power shaft, a body slidably mounted on said guide for movement transversely of a saw held in said supporting means, a frame carried by the body, means coupling the shaft and body whereby reciprocable movement is transmitted to the body, a rotary cam unit carried by the frame and operatively engaging the guide whereby relative movement of the guide and body will effect rotation of the cam unit, a file carrier oscillatably supported by the frame, and a member carried by the file carrier and engaged by the cam unit whereby said unit on rotation effects oscillation of said carrier relative to a saw held in the supporting means.

8. In a saw filing machine, a saw support, a rack disposed transversely thereof, a body mounted for reciprocatory movement longitudinally of and parallel with the rack, power means for reciprocating said body, a threaded guide carried by the body at an elevation above the rack, a stub shaft extending across the rack and having an end threadably adjustably engaged in said guide, a toothed pinion rotatably mounted on the shaft and in toothed engagement with the rack, circular cam means on one face of the pinion, a file carrying frame oscillatably coupled with the body for vertical movement, and a cam finger carried by said frame and engaged by said circular cam by which vertical oscillation of the frame is effected.

9. In a saw filing machine including a reciprocably mounted file carrier, a saw clamp, means carrying the clamp permitting sliding movement of the same in a path transversely of the line of movement of the file carrier, a power shaft, means for operating the file carrier, a saw shifting finger, means supporting said finger over said clamp in position to engage the teeth of a saw therein, said last means being pivoted for oscillation in a plane parallelling the direction of movement of the saw clamp, a rotary cam operated by said power shaft and effecting the intermittent oscillation of the finger supporting means, means forming a vertical pivot for said clamp carrying means, a wheel carried by said power shaft, said wheel having a groove therein encircling and eccentric to said shaft, an arm oscillatably supported at one end and carrying a pin engaged in said groove, and a coupling between the other end of said arm and said clamp carrying means.

10. In a saw filing machine, a saw supporting means, a body mounted for reciprocation in a path extending transversely of the edge of a saw carried by said means, a file carrier oscillatably attached to said body for movement in a vertical plane and including means for suppporting a file in parallel relation with the path on which the body is reciprocated, a cam finger carried by the file carrier, and a cam unit with which said finger has relative movement in its reciprocatory movement with the file carrier, comprising two finger-engaging surfaces having fixed spaced parallel relation, one of said surfaces having a central opening through which the finger may pass to the other surface and yieldable resilient fingers each integral at one end with an end of the surface having the central opening whereby the first finger may pass from the unbroken surface past the other free end of either finger and ride back 11. In a saw filing machine, a saw suppporting means, a body mounted for reciprocation in a path extending transversely of the edge of a saw carried by said means, a file carrier oscillatably attached to said body for movement in a vertical plane and including means for supporting a file in parallel relation with the path on which the body is reciprocated, a cam finger carried by the file carrier, and a cam unit with which said finger has relative movement comprising a straight bar mounted to extend parallel with the path of reciprocation of the file carrier supporting body and having a longitudinal surface for engagement by said finger, means forming a second finger-engaging surface paralleling said first surface and having a central opening in the passage of the finger therethrough to the first surface, and a resilient finger joined to each end of the second surface and extending obliquely therefrom to the first surface to facilitate the movement of the first finger from the first surface onto the second surface.

12. In a saw filing machine, a saw supporting means, a body mounted for reciprocation in a path extending transversely of the edge of a saw carried by said means, a file carrier oscillatably attached to said body for movement in a vertical plane and including means for supporting a file in parallel relation with the path on which the body is reciprocated, a cam finger carried by the file carrier, a cam unit with which said finger has relative movement in its reciprocatory movement with the file carrier, comprising two finger-engaging surfaces having fixed spaced parallel relation, one of said surfaces having a central opening through which the finger may pass to the other surface and yieldable resilient fingers each integral at one end with an end of the surface having the central opening whereby the first finger may pass from the unbroken surface past the other free end of either finger and ride back over the resilient finger onto the centrally opened surface, and means whereby said cam unit may be shifted as a whole transversely to the path in which said finger reciprocates to vary the degree of vertical oscillation imparted through the finger to the file carrier.

13. In a saw filing machine, a saw supporting means, a body mounted for reciprocation in a path extending transversely of the edge of a saw carried by said means, a file carrier oscillatably attached to said body for movement in a vertical plane and including means for supporting a file in parallel relation with the path on which the body is reciprocated, a cam finger carried by the file carrier, a cam unit with which said finger has relative movement comprising a straight bar mounted to extend parallel with the path of reciprocation of the file carrier supporting body and having a longitudinal surface for engagement by said finger, means forming a second finger-engaging surface paralleling said first surface and having a central opening in the passage of the finger therethrough to the first surface, a resilient finger joined to each end of the second surface and extending obliquely therefrom to the first surface to facilitate the movement of the first finger from the first surface onto the second surface, and means for oscillating said bar on an axis extending longitudinally thereof to move the finger-engaging surfaces transversely of the path of reciprocation of the finger.

14. In a saw filing machine including means for supporting and effecting the movement of the file in a horizontal reciprocatory path and a vertical oscillatory path, a saw support comprising a base, a head oscillatably carried on the base for movement about a vertical axis, said head being in two slidably connected parts, means for mounting a saw on one of said parts, the saw when so mounted lying beneath the file supporting means, means for oscillating said head to angularly dispose a saw thereon relatively to a file in the file supporting means, means for engaging the toothed edge of the saw for shifting the same relative to the head, and means for shifting the saw carrying one of the head parts in a plane perpendicular to said axis to center a saw carried thereby relative to the file and said saw tooth edge engaging means.

15. In a machine for filing circular saws, a base, a head mounted upon said base for oscillation about a vertical axis, said head being formed in two slidably connected parts, said head having a recess opening downwardly through the top part thereof, a hub disposed in said recess and adjustable for engagement in a central opening of a circular saw to maintain the latter in the recess with an edge projecting above the top of the recess, holding means at the upper part of the recess for engaging the saw to prevent lateral movement of the same but permitting rotary movement of the saw upon said hub, filing mechanism lying over the head for operation on a saw carried thereby, means for effecting a step by step rotary movement of the saw between the periods of operation of the filing mechanism thereon, and means for effecting the adjusting movement of the saw carrying part of said head in a plane perpendicular to its pivotal axis for the centering of the saw relative to the file and to the tooth engaging means by which the rotation of the saw is effected.

16. In a saw filing machine including means for supporting and effecting the movement of a file in a horizontal reciprocatory path and a vertical oscillatory path, a saw support comprising a base, a head structure mounted on the base for oscillation about a vertical axis, said head including upper and lower parts slidably connected whereby the upper part may be shifted in a plane perpendicular to said axis, means for mounting a saw on the upper one of said head parts, said saw mounting means being mounted for movement relative to the head and in a path transversely to the path of movement of the file, means for effecting the oscillation of the head on said axis in synchronism with the reciprocatory movement of the file, means operating to shift the saw and mounting means therefor when the file is raised from the saw and when the saw is in right angular relation with the file, and means for shifting the upper part of the head relative to the lower part and base in said perpendicular plane to center the saw relative to the file and the saw shifting means.

17. In a machine for filing circular saws, a base, a head mounted upon said base and including upper and lower slidably connected parts, means coupling the lower one of said parts with the base facilitating oscillation of the head about a vertical axis, the connection between said head parts permitting movement of the upper part in a path perpendicular to said axis, said head upper part having a recess opening downwardly through the top thereof, a hub disposed in said recess and adjustable for engagement in a central opening in a circular saw to maintain the latter in the recess with an edge projecting above the top of the recess, holding means at the upper part of the recess for engaging the saw to prevent lateral movement of the same but permitting rotary movement of the saw upon the hub, filing mechanism lying over the head for operation on a saw carried thereby, means for effecting a step by step rotary movement of the saw between the periods of operation thereon by the filing mechanism, and means for effecting adjusting movement of the upper part of said head on the said perpendicular path for centering the saw relative to the file and to the tooth engaging means by which rotation of the saw is effected.

18. In a saw filing machine including a reciprocably mounted file carrier, a saw clamp, means carrying the clamp permitting sliding movement of the same in a path transversely of the line of movement of the file carrier, a power shaft, means for operating the file carrier from said shaft, a vertical post mounted for oscillation on a horizontal axis and having an arm disposed across the saw clamp, a saw shifting finger pivoted to said arm for vertical oscillation relative to a saw in the clamp, said post axis permitting oscillation of the post in a vertical plane paralleling the path of movement of the saw clamp, a rotating wheel, a second post mounted for oscillation on the same axis as the first post, a pair of arms carried by the second post, one of said pair of arms extending across the first post, the other arm of said pair projecting across a face of the wheel, cam means on the said wheel face for engaging the last mentioned arm to effect the intermittent oscillation of the finger supporting post, and a set screw carried by the first arm of said pair and engaging the first post for adjusting the relative positions of the posts.

THOMAS H. GAVIN.